(12) United States Patent
Min-cheol

(10) Patent No.: US 6,688,651 B2
(45) Date of Patent: Feb. 10, 2004

(54) DEVICE FOR LOCKING CAP NUT FOR COUPLING

(75) Inventor: Choe Min-cheol, Incheon (KR)

(73) Assignee: DMT Co., Ltd., Incheon (KR)

( * ) Notice: Subject to any disclaimer, the term of this patent is extended or adjusted under 35 U.S.C. 154(b) by 0 days.

(21) Appl. No.: 10/082,197

(22) Filed: Feb. 26, 2002

(65) Prior Publication Data

US 2003/0160449 A1 Aug. 28, 2003

(51) Int. Cl.⁷ ............................................. F16L 55/00
(52) U.S. Cl. ............................................................. 285/92
(58) Field of Search ........................................... 285/92

(56) References Cited

U.S. PATENT DOCUMENTS

| | | | | |
|---|---|---|---|---|
| 4,940,260 A | * | 7/1990 | Uriarte Odriozola | 285/3 |
| 5,188,398 A | * | 2/1993 | Parimore et al. | 285/39 |
| 5,328,101 A | * | 7/1994 | Munshi | 239/600 |
| 5,388,866 A | * | 2/1995 | Schlosser | 285/92 |
| 5,393,104 A | * | 2/1995 | Zornow | 285/40 |
| 5,746,454 A | * | 5/1998 | Webb | 285/92 |
| 5,785,357 A | * | 7/1998 | Foster et al. | 285/92 |
| 5,871,239 A | * | 2/1999 | Boscaljon et al. | 285/81 |
| 6,073,973 A | * | 6/2000 | Boscaljon et al. | 285/81 |
| 6,142,535 A | * | 11/2000 | Nishio et al. | 285/92 |
| 6,334,632 B1 | * | 1/2002 | Nishio et al. | 285/92 |

* cited by examiner

*Primary Examiner*—Lynne H. Browne
*Assistant Examiner*—James M. Hewitt
(74) *Attorney, Agent, or Firm*—Rothwell, Figg, Ernst & Manbeck

(57) ABSTRACT

A device for locking a cap nut for a coupling includes a hooking plate 100 extended out of the body 50 connected to the metallic connecting pipe 21, a plurality of hooking protrusions 110 protruded from the hooking plate 100 at a regular space, and a plurality of hooking grooves 200 formed at a position facing the hooking protrusion 110 and engaged with the hooking protrusion 110 to prevent the cap nut 40 from being released when screwing the cap nut 40, so as to prevent the cap nut 40 from being released, so eventually securely assembling the connecting pipes 21 not to be separated from the coupling 10.

3 Claims, 5 Drawing Sheets

DEVICE FOR LOCKING CAP NUT FOR COUPLING

FIELD OF THE INVENTION

The present invention relates to a device for locking a cap nut for a coupling, and more particularly to a device for locking a cap nut for a coupling, which is applied to the cap nut screwed with a body so as to prevent the cap nut from being released, so eventually securely assembling the connecting pipes not to be separated from the coupling.

BACKGROUND OF THE INVENTION

Generally, a coupling is used for connecting pipes made of synthetic resin or metal used for a water purifier or chemical delivery. Such a coupling is required to be easily connected to the pipes, maintain sufficient watertight and sealing characteristics, and be securely fixed.

A conventional coupling 1 is shown in FIG. 1, and now described below in brief. As shown in FIG. 1, the coupling 1 includes a body 5, which is, at one side, connected to a connecting pipe 2a made of synthetic resin and, at the other side, connected to a connecting pipe 2 made of metal, and a cap nut 4 screwed with the body 5 when the metallic connecting pipe 2 is inserted into the body 5 for pressing a collet 3 to prevent the connecting pipe 2 from being deviated from the body 5.

In such a conventional coupling 1 constructed as above, because the collet 3 tightens the surface of the connecting pipe 2 when the cap nut 4 is screwed to connect the metallic connecting pipe 2 in the body 5, the connecting pipe 2 is securely connected and fixed to the coupling 1 not to be separated.

However, when the coupling 1 is applied to a vibrated product, it is possible that the screwed cap nut 4 is released due to continuous vibration for a long time because the coupling 1 does not have any locking device to prevent release of the cap nut 4. If the cap nut 4 is released, the collet 3 cannot tighten the surface of the connecting pipe 2, which makes the connecting pipe 2 separated from the coupling 1. Therefore, there is still a need to develop a coupling with a function of keeping tight combination between the coupling and the connecting pipe regardless of vibration.

SUMMARY OF THE INVENTION

Therefore, the present invention is designed to solve the problem of the prior art, and an object of the present invention is to provide a device for locking a cap nut for a coupling, which is applied to the cap nut screwed with a body so as to prevent the cap nut from being unscrewed due to vibration, so ensuring the connecting pipe not to be separated from the coupling.

In order to obtain the above object, the present invention provides a device for locking a cap nut for a coupling, which includes a body connected to a connecting pipe made of a synthetic resin at one side and connected to a connecting pipe made of a metal at the other side, and a cap nut screwed with the body when the metallic connecting pipe is inserted into the body for pressing a collet to prevent the connecting pipe from being deviated from the body, comprises a hooking plate extended out of the body which is connected to the metallic connecting pipe, a plurality of regularly spaced hooking protrusions protruded from the hooking plate, and a plurality of hooking grooves formed at positions facing the hooking protrusions and engaged with the hooking protrusions to prevent the cap nut from being released when screwing the cap nut.

BRIEF DESCRIPTION OF THE DRAWINGS

These and other features, aspects, and advantages of preferred embodiments of the present invention will be more fully described in the following detailed description, taken accompanying drawings. In the drawings.

DETAILED DESCRIPTION OF THE EMBODIMENTS

Figure 1:
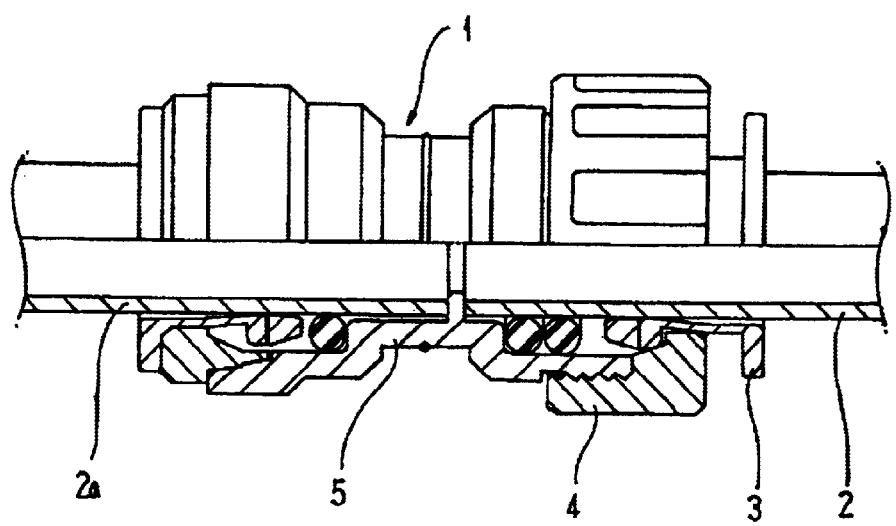
FIG. 1 is a sectional view showing a coupling of the prior art.
Figure 2:
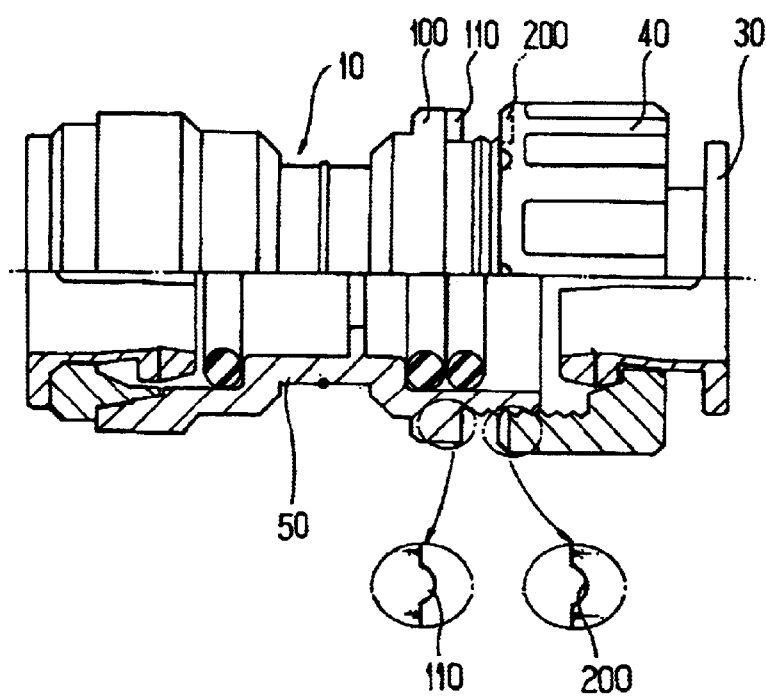
FIG. 2 is a sectional view showing a coupling according to the present invention.
Figure 3:
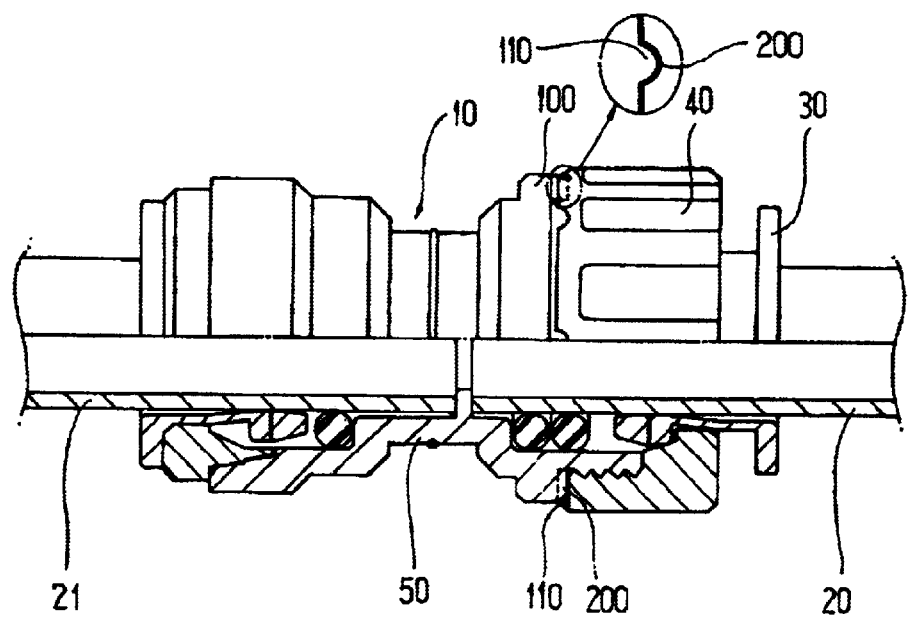
FIG. 3 is a sectional view showing that the coupling is connected to connecting pipes according to the present invention.
Figure 4:
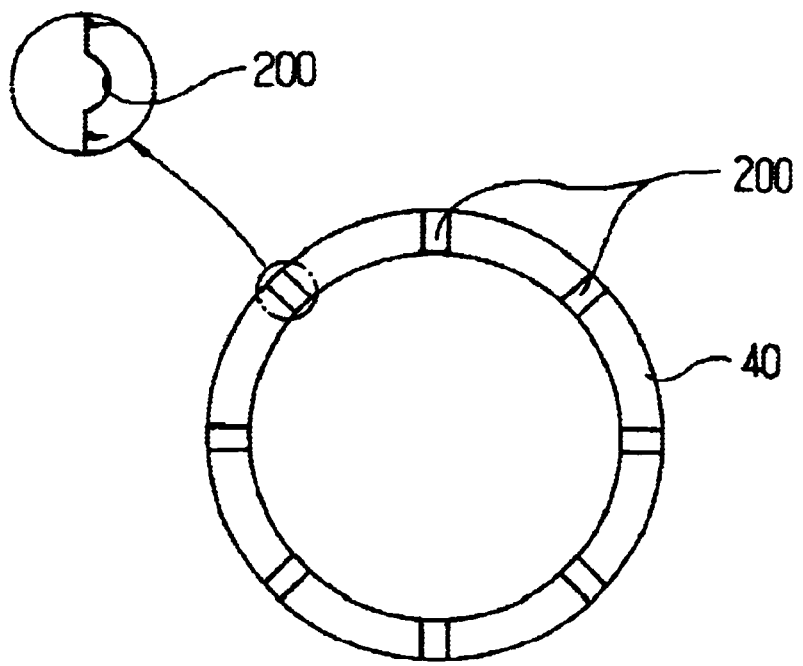
FIG. 4 is a side view showing a hooking groove formed at a cap nut of the present invention.
Figure 5:
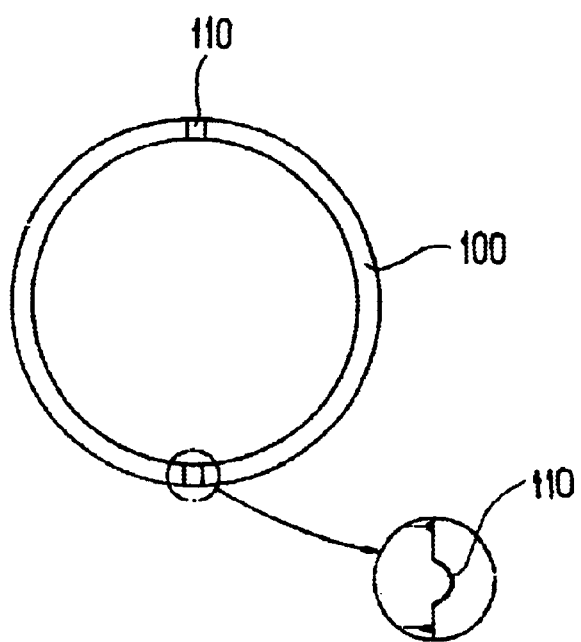
FIG. 5 is a side view showing a hooking protrusion formed at a body according to the present invention.

Hereinafter, preferred embodiments of the present invention will be described in detail with reference to the accompanying drawings. FIG. 2 is a sectional view showing a coupling to which a locking device of the present invention is applied, FIG. 3 is a sectional view showing that the coupling is combined with connecting pipes according to the present invention, FIG. 4 is a side view showing a hooking groove formed at a cap nut according to the present invention, and FIG. 5 is a side view showing a hooking protrusion formed at a body according to the present invention.

In the present invention, the coupling 10 includes a body 50, which is connected to a connecting pipe 21 made of synthetic resin at one side and a connecting pipe 20 made of metal at the other side, and a cap nut 40 screwed with the body 50 when the metallic connecting pipe 20 is inserted into the body 50 for pressing a collet 30 to prevent the connecting pipe 20 from being deviated from the body 50, similar to the prior art.

Additionally, in order to prevent the cap nut 40 from being released when the coupling 10 is applied to a vibrated product., the present invention includes a hooking plate 100 extended out of the body 50 which is connected to the metallic connecting pipe 20, hooking protrusions 110 protruded from the hooking plate 100 at a regular space, and hooking grooves 200 formed at a position facing the hooking protrusion 110 and engaged with the hooking protrusion 110 to prevent the cap nut 40 from being released when screwing the cap nut 40.

At this time, though it is described that the hooking groove 200 is formed at the cap nut 40 and the hooking protrusion 110 is formed at the body 50, it is not limited with this configuration. If preventing the cap nut 40 from being unscrewed, it is also possible to form the hooking protrusion at the cap nut 40 and the hooking groove at the body 50. In addition, the hooking protrusion 110 and the hooking groove 200 have an outer appearance of semi-circle or rounded so that the cap nut 40 may be smoothly assembled or disassembled.

The locking device including the hooking protrusion and the hooking groove can be applied to various types of couplings such as T-type, L-type, Y-type or +-type couplings, though just a straight type coupling is shown in the figures. In addition, the locking device of the present invention may be used for not only the metallic connecting pipe 20 but also other connecting pipes made of soft or hard materials, with ensuring the secure combination of the pipe.

The process of using the locking device of the present invention is as follows. At first, as shown in FIG. 2, the collet 30 and the cap nut 40 are attached to the body 50 of the coupling 10. Then, as shown in FIG. 3, the metallic connecting pipe 20 is inserted into the body 50 and the cap nut 40 is screwed, which makes the collet 30 move in the same direction as the cap nut 40. At this time, because the collet 30 tightens the surface of the connecting pipe 20 during movement, the connecting pipe 20 is fixed to the coupling 10 without separation.

If the cap nut 40 is continually screwed at this state, the hooking groove 200 becomes faced with the hooking protrusion 110 of the hooking plate 100. At this time, because the hooking groove 200 is restricted by the hooking protrusion 110, the cap nut 40 will not be released though vibration is exerted to the coupling 10. Therefore, the connecting pipe 20 can maintain its combined state, so giving its own function continuously. Even though enduring external interference such as vibration, impact, extension, bending of the connecting pipe, external temperature, temperature of operating fluid, etc., the cap nut 40 is not released as the hooking groove 200 is restricted to the hooking protrusion 110. Therefore, the connecting pipe 20 will not be taken off from the coupling 10.

On the other hand, if the hooking groove 200 is not naturally restricted to the hooking protrusion 110 while a worker or an operator screws the cap nut 40, the worker may exert little more power to the cap 40 so that the hooking grooves 200 separately arranged at 45 degrees are forced to be restricted to the hooking protrusions 110. In other words, since the hooking grooves 200 are arranged with a space at an angle of 45 degrees, the hooking groove 200 becomes restricted to the hooking protrusion 110 without too much power.

In the separation of the cap 40, the worker may easily disassemble the cap nut 40 because the hooking protrusion is rounded, even though the cap nut 40 is securely fixed to the body 50 by a contact of the hooking groove 200 and the hooking protrusion 110.

As described above, by using the locking device of the present invention having the hooking protrusions and the hooking grooves, the cap nut is prevented from being released by vibration, so eventually securely assembling the connecting pipes not to be separated from the coupling and operate its own functions.

The device for locking a cap nut for a coupling according to the present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A device for locking a cap nut for a coupling (10), which includes a body (60) connected to a connecting pipe (21) made of a synthetic resin at one side and connected to a connecting pipe (20) made of a metal at the other side, the cap nut (40) screwed into the body about an axis of rotation of the body when the metallic connecting pipe (20) is inserted into the body (50) for pressing a collet (30) to prevent the connecting pipe (20) from disconnecting from the body (50), the device comprising:

a hooking plate (100) disposed on the body (50), said hooking plate having a first surface substantially normal to the axis of rotation;

a plurality of regularly spaced, substantial semi-circular hooking protrusions (110) disposed radially around the axis of rotation in the first surface of the hooking plate (100), the protrusions extending outward from the plate in a direction parallel to the longitudinal axis of the pipes;

said cap nut having a second surface substantially parallel to said first surface when said cap nut is screwed into the body; and a plurality of substantially semi-circular hooking grooves (200) disposed radially around the axis of rotation in the second surface, the grooves extending into the cap nut in the direction parallel to the longitudinal axis of the pipes, one of said hooking grooves formed at a position facing each of the hooking protrusions (110) such that each of said hooking protrusions are engaged with a corresponding one of the hooking grooves (200) to prevent the cap nut (40) from being released when the cap nut (40) is screwed into the body.

2. A device for locking a cap nut for a coupling, comprising:

a body connected to a first connecting pipe and a second connecting pipe, the cap nut threadably disposed in the body about an axis of rotation of the body when the second connecting pipe is inserted into the body, said body having a first surface substantially normal to the axis of rotation, a plurality of regularly spaced, substantially semi-circular hooking protrusions disposed radially around the axis of rotation in the first surface, the protrusions extending outward from the plate in direction parallel to the longitudinal axis of the pipes;

said cap nut pressing a collet toward said body to prevent the connecting pipe from disconnecting from the body;

said cap nut having a second surface substantially parallel to said first surface when said cap nut is screwed into the body; and a plurality of substantially semi-circular hooking grooves disposed radially around the axis of rotation in the second surface, the grooves extending into the cap nut in the direction parallel to the longitudinal axis of the pipes, one of said hooking grooves formed at a position facing each of the hooking protrusions such that each of said hooking protrusions are engaged with a corresponding one of the hooking grooves to prevent the cap nut from being released when the cap nut is screwed into the body.

3. A device for locking a cap nut for a coupling, comprising:

a body connected to a first connecting pipe and a second connecting pipe, the cap nut threadably disposed in the body about an axis of rotation of the body when the second connecting pipe is inserted into the body, said body having a first surface substantially normal to the axis of rotation, a plurality of regularly spaced, substantially semi-circular hooking grooves disposed radially around the axis of rotation in the first surface, the grooves extending into the body in a direction parallel to the longitudinal axis of the pipes;

said cap nut pressing a collet toward said body to prevent the connecting pipe from disconnecting from the body;

said cap nut having a second surface substantially parallel to said first surface when said cap nut is screwed into the body; and a plurality of substantially semi-circular hooking protrusions disposed radially around the axis of rotation in the second surface, the hooking protrusions extending outward from the cap nut in the direction parallel to the longitudinal axis of the pipes, one of said hooking grooves formed at a position facing each of the hooking protrusions such that each of said hooking protrusions are engaged with a corresponding one of the hooking grooves to prevent the cap nut from being released when the cap nut is screwed into the body.

* * * * *